United States Patent [19]

Balduin et al.

[11] Patent Number: 4,638,876
[45] Date of Patent: Jan. 27, 1987

[54] WEIGHING APPARATUS

[75] Inventors: Franz Balduin, Eilendorferstr. 145, 5100 Aachen, Fed. Rep. of Germany; Ernst Adenauer, Aachen, Fed. Rep. of Germany

[73] Assignee: Franz Balduin, Aachen, Fed. Rep. of Germany

[21] Appl. No.: 783,760

[22] Filed: Oct. 3, 1985

[30] Foreign Application Priority Data

Oct. 5, 1984 [DE] Fed. Rep. of Germany ... 8429287[U]
Aug. 3, 1985 [DE] Fed. Rep. of Germany ... 8522425[U]

[51] Int. Cl.$^4$ ............................................. G01G 19/08
[52] U.S. Cl. .................................... 177/139; 177/140; 177/DIG. 9
[58] Field of Search .......... 177/139, 140, 255, DIG. 9

[56] References Cited

U.S. PATENT DOCUMENTS

| 3,063,576 | 11/1962 | Hofmeister | 177/139 X |
| 3,431,992 | 3/1969 | Whitecar | 177/140 |
| 3,899,034 | 8/1975 | Polen et al. | 177/255 X |
| 4,248,317 | 2/1981 | Rahar | 177/DIG. 9 |
| 4,411,327 | 10/1983 | Lockery et al. | 177/DIG. 9 |
| 4,503,921 | 3/1985 | Polen et al. | 177/147 |

Primary Examiner—George H. Miller, Jr.
Attorney, Agent, or Firm—Collard, Roe & Galgano

[57] ABSTRACT

A weighing apparatus for weighing eccentric loads for use with a forklift is provided, the weighing plate of the apparatus forms the loading surface of the forklift, three weight measuring systems or weighing cells which input a computing device engage with the weighing plate, one at the steering head and one each at the support struts in front of the rollers thereof. The coupling bars which operatively interconnect the steering head with the rollers are designed not to interfere with the weight measuring systems of the respective support struts.

3 Claims, 7 Drawing Figures

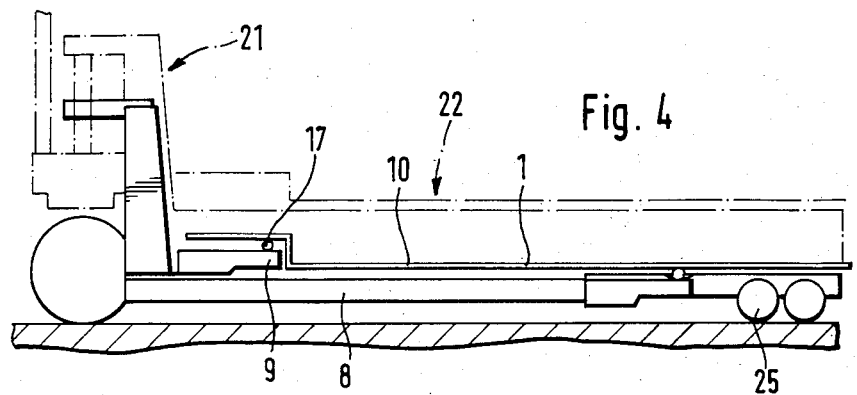
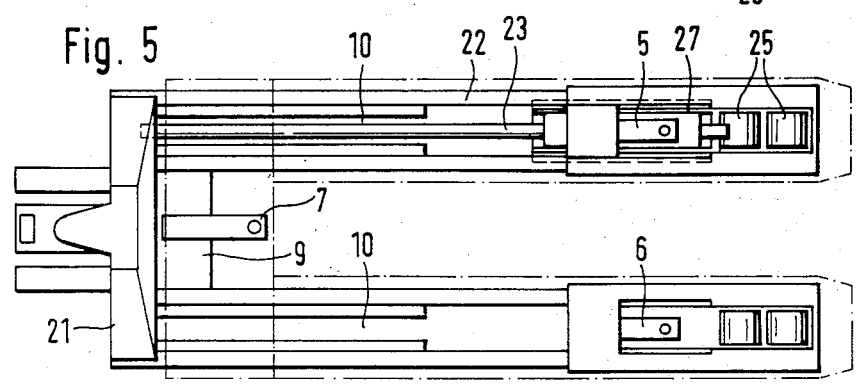
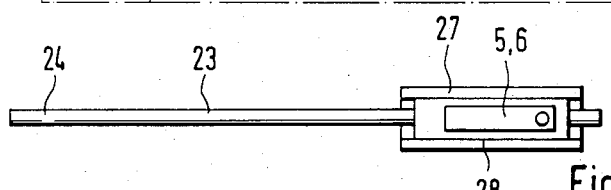
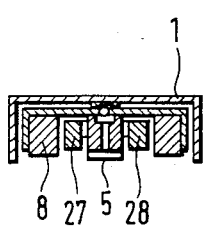

WEIGHING APPARATUS

BACKGROUND OF THE INVENTION

The present invention relates to a weighing apparatus which is capable of performing accurate weighing despite eccentric weight loading on the device. More particularly, the present invention relates to a weighing apparatus having at least three weight measuring systems or weighing cells which provide input to a computing device, for the weighing of eccentrically loaded weights.

If a weighing plate acting on three weighing cells is greatly loaded on one side, i.e. loaded highly eccentrically, it may lift from the one weighing cell and support itself on the casing of the apparatus, with resulting errors in weight measurement. In order to avoid such errors, stops or the like may be provided on the casing. However, even in this case, the weighing plate will support itself on the casing with the result that the weight measurements are inaccurate.

Accordingly it is an object of the present invention to provide a weighing apparatus which provides correct weight measurement results even if subjected to eccentric loading.

SUMMARY OF THE INVENTION

The above object is accomplished according to the present invention by a weighing apparatus wherein weighing cells engage a weighing plate and are fully activated even with eccentric loads, i.e., they are always subjected to a negative, zero or positive load (pulling or pressure load) which, when added supplies the correct measurement result.

Preferably the weighing device according to the invention can be mounted on a forklift for transporting pallets, or integrated with such a lift. When loading and/or transporting pallets, it is often desirable to know the weight of the goods loaded on the pallet. To determine the pallet weight, known stationary scales in the form of a flat "U" have been used by driving the forklift loaded with a pallet between the legs of the scale and depositing the load on the legs. Once the weight has been measured, the load is picked up again and removed by the forklift. In many cases, this procedure is very complicated or cumbersome.

It has been found that it is not readily possible to arrange a weighing apparatus on a forklift, i.e., to accommodate weighing cells in a suitable way in the center of each fork while still permitting a trouble-free operation of the forklift in its normal operation.

Other objects and features of the present invention will become apparent from the following detailed description considered in connection with the accompanying drawing. It is to be understood, however, that the drawing is designed as an illustration only and not as a definition of the limits of the invention.

In the drawing, wherein similar reference characters denote similar elements throughout the several views:

FIG. 4 is a schematic side view of the weighing apparatus adapted to a forklift;

FIG. 5 is a plan view of the weighing apparatus of FIG. 4;

FIG. 6 is a plan view of a part of the weighing apparatus of FIG. 4 with the device removed from the forklift; and FIG. 7 is an enlarged cross-sectional view of a part of the weighing apparatus as shown in FIG. 4.

DETAILED DESCRIPTION OF THE PREFERRED EMBODIMENT

Figure 1:
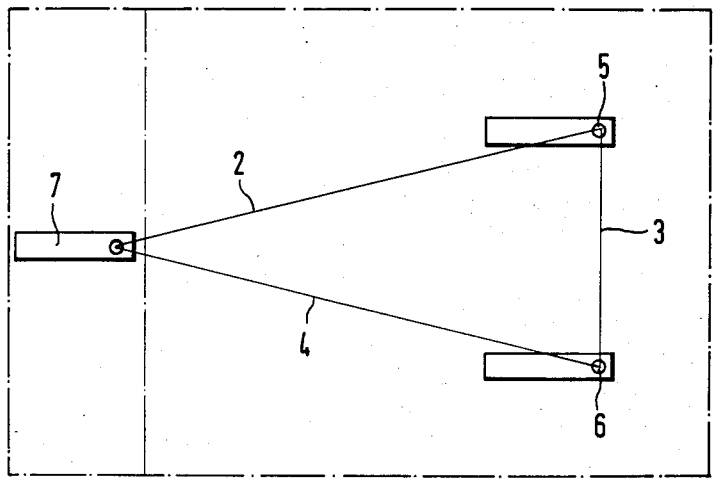
FIG. 1 is a schematic plan view of the weighing apparatus according to the present invention.

Turning now in detail to the drawings, therein illustrated is a novel weighing apparatus embodying the present invention which, as shown in FIG. 1, includes a weighing plate 1 with the three weight measuring systems or weighing cells 5, 6 and 7 engaging the plate. Weighing cells 5, 6 and 7 are arranged on a casing 8 in a way such that their lines of connection 2, 3, and 4, form a triangle, so that a perfect 3-point bearing is obtained.

Figure 2:
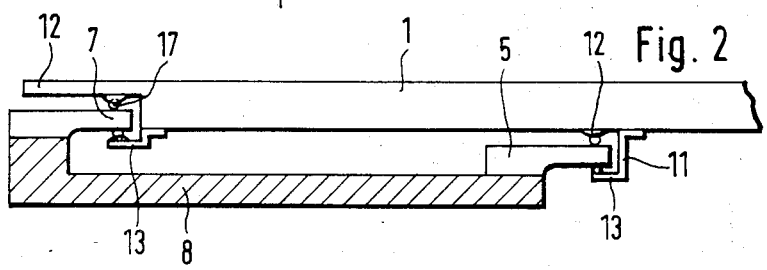
FIG. 2 is a longitudinal sectional view of the weighing apparatus of FIG. 1 adapted to a forklift.

FIG. 2 shows a weighing device according to the invention for use with a forklift used for transporting pallets. Casing 8, which forms the undercarriage of the forklift, and weighing plate 1 are shown.

Figure 3:
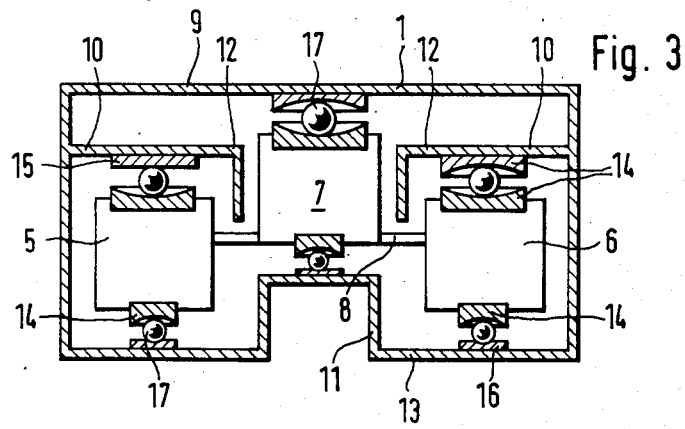
FIG. 3 is a schematic cross-sectional view of the weighing apparatus according to FIG. 2.

As shown in the schematic cross section of FIG. 3, weighing plate 1 has two parallel legs or supporting forks 10 rigidly connected toward the sides of a crosspiece 9, with a spacing between the forks. A cover element 11 is rigidly connected to and forms part of weighing plate 1. The cover element is shown schematically only in order to illustrate its rigid connection with crosspiece 9 and struts 10.

Three weighing cells 5, 6 and 7, are rigidly connected to casing 8 and are disposed between two supports 12 and 13, which are formed by weighing plate 1 and cover element 11 (FIG. 2). The weighing cells are connected in a manner known per se to an electronic computing and indicating unit which itself is not a subject of the present invention.

The forklift 22, shown in FIGS. 4 and 5, is comprised of a pole-guided steering head 21 having an underframe 8 secured to steering head 21 in a way such that it can be raised and lowered. The underframe itself is formed by two parallel supporting forks 10 and crosspiece 9, which is arranged on the steering head 21 for rigidly connecting the supporting forks 10 to each other. The rollers 25 for forks 10 are supported on levers (not shown) at the free ends of supporting forks 10. Each lever is engaged by a coupling bar 23 whose front end 24 articulately engages an elbow lever (not shown) arranged in steering head 21. A parallel motion of the levers is effected by means of coupling bar 23, causing rollers 25 to swivel with respect to, and thereby lift the underframe.

As shown in particular in FIG. 5, for achieving accurate weight measurements, weighing cells 5 and 6 are each arranged on forklift 22 in the center of a supporting fork while weighing cell 7 is positioned in the center of crosspiece 9. The weighing cells are positioned on the forklift with as much spacing between each other as possible.

Each weight measuring device 5, 6 and 7 supports on its movable correcting element a bearing pan 14 and a ball bearing 17 disposed in the pan (FIG. 3). Supporting forks 10 and crosspiece 9 of undercarriage 8 are covered by weighing plate 1, which is provided in the shape of a matching hood. On its bottom side, at the points associated with the weighing cells 5, 6 and 7, weighing plate 1 has bearing surfaces. The bearing surfaces associated with weighing cells 7 and 5 of crosspiece 9 and of one supporting fork 10, respectively, are provided in the form of a bearing pan 14. However, the bearing surface associated with weighing cell 6 is provided with the shape of a flat bearing surface 15. In this way, bearing inaccuracies and thermal expansions etc. may be compensated for.

FIGS. 5 and 6 show that each coupling bar 23, within the zone of weighing cells 5 and 6 arranged on supporting forks 10, is designed in the form of two rails, wherein the two rails 27 and 28 of coupling bar 23 surrounded each weighing cell 5 and 6. A space is provided between weighing cell 5, 6 and bar 23 in order to take into account the stroke of bar 23 in the axial direction for actuating the levers for rollers 25.

By designing coupling bar 23 as specified above, it is possible to arrange weighing cells 5 and 6 in the center of supporting fork 10 without interfering with the actuation of rollers 25 by means of coupling bar 23.

In particular FIG. 3 shows that each movable correcting element of weighing cells 5, 6 and 7 supports a pan-like bearing plate 14 on top of and beneath the weighing cell. The weighing cells are each associated at weighing plate 1 and cover element 11 with matching counterpressure plates 15 and 16. Ball bearing 17 is arranged with a small amount of play or clearance in each case between bearing plate 14 and counterpressure plates 15 and 16. In order to avoid jamming, it is useful if at least one of the counterpressure plates of each 3-plate group is provided in the form of a flat plate 16.

If weighing plate 1 is loaded centrally, the correcting elements of weighing cells 5, 6 and 7 are pressure loaded on their top sides in a known manner.

If weighing plate 1 is loaded eccentrically, only the correcting elements of two weighing cells are pressure stressed on their top sides, whereas the correcting element of the third weighing cell supports itself with its underside on a leg 13 of cover 11. The reversal of force on the third weighing cell effects a compensation of the additional load acting on the two other weighing cells, permitting a stated and firm mathematical summation compensation.

While only a single embodiment of the present invention has been shown and described, it will be obvious that many changes and modifications may be made thereunto without departing from the spirit and scope of the invention.

What is claimed is:

1. A weighing apparatus having at least three weight measuring systems which input a computing device for use with a forklift, said forklift having two parallel supporting struts extending from a crosspiece therebetween with rollers supported at the ends of the struts, steering head arranged at the front end of the forklift, an undercarriage for the forklift, coupling bar arranged in said struts and operatively interconnecting the steering head and the rollers, said weighing apparatus comprising:

a weighing plate forming the loading surface of the forklift;
   said undercarriage supporting a weight measuring system disposed on the center axis of the forklift behind said steering head and at least one weight measuring system disposed on the center axis of each supporting strut in front of the rollers supported thereby, each said weight measuring system being disposed between said undercarriage and said weighing plate and a ball bearing supported between each said undercarriage and weighing plate and the associated weight measuring system with a slight clearance; and
   each coupling bar including at least in the zone of the weight measuring system supported by the respective strut, two rails disposed around said respective weight measuring system with a spacing between said respective coupling bar and said respective weight measuring system.

2. The weighing apparatus as defined in claim 1, wherein each weight measuring system supports a pan-like bearing plate having a ball bearing loosely disposed therein, and on the bottom side of the weighing plate facing said ball bearings there are provided counterpressure plates of which at least two are in the form of said pan-like bearing plates and at least one in the form of a flat bearing plate.

3. The weighing apparatus as defined in claim 2, wherein the bearing plates on the bottom side of the weighing plate are provided above the one supporting strut in the form of a pan-like bearing plate and above the other supporting strut in the form of flat bearing plates.

* * * * *